United States Patent [19]
Neier

[11] Patent Number: 5,242,121
[45] Date of Patent: Sep. 7, 1993

[54] BALE SUPPORT AND CUTTER

[75] Inventor: Benjamin R. Neier, Dodge City, Kans.

[73] Assignee: Roto-Mix Enterprises, Ltd., Dodge City, Kans.

[21] Appl. No.: 748,836

[22] Filed: Aug. 23, 1991

[51] Int. Cl.$^5$ .............................................. A01D 55/00
[52] U.S. Cl. ................................... 241/28; 241/101.7; 241/605; 83/928; 83/795
[58] Field of Search ................. 241/605, 101.7, 28; 83/928, 795

[56] References Cited

U.S. PATENT DOCUMENTS

| | | |
|---|---|---|
| 870,474 | 11/1907 | Scott. |
| 3,517,711 | 6/1970 | Reeser et al. ............... 83/928 X |
| 3,519,042 | 7/1970 | Domres ....................... 83/928 X |
| 4,163,524 | 8/1979 | Lundahl et al. ............ 241/605 X |
| 4,187,990 | 2/1980 | Lundahl et al. ............ 241/605 X |
| 4,245,535 | 1/1981 | Lockwood et al. ......... 83/795 X |
| 4,250,783 | 2/1981 | Ogle. |
| 4,336,732 | 6/1982 | Liet et al. ................. 241/101.7 X |
| 4,341,354 | 7/1982 | Liet et al. ................... 83/928 X |
| 4,476,761 | 10/1984 | Bird ............................ 83/928 X |
| 4,771,670 | 9/1988 | Woerman .................... 83/928 X |
| 4,813,615 | 3/1989 | Hosel et al. ................ 241/605 X |
| 4,813,616 | 3/1989 | Hosel et al. ................ 241/605 X |
| 4,923,128 | 5/1990 | Ostrowski .................. 241/605 X |
| 5,033,684 | 7/1991 | von der Herde ............. 83/928 X |
| 5,090,630 | 2/1992 | Kopecky et al. ........... 241/605 X |
| 5,161,448 | 11/1992 | Wangsness .................. 83/928 X |

OTHER PUBLICATIONS

1 Page, 2 sided RMH Industries, Inc., Self-Supported Role Bales Cutting Machine.

*Primary Examiner*—Mark Rosenbaum
*Assistant Examiner*—Frances Chin
*Attorney, Agent, or Firm*—Zarley, McKee, Thomte, Voorhees & Sease

[57] ABSTRACT

A frame work is mounted on a 3 point hitch of a tractor and includes on its lower end a pair of bale support forks extending rearwardly. A pair of vertically disposed rails carry a vertically movable sickle cutter which extends parallel to the support forks and is centered to move therebetween when cutting through a bale positioned on the forks with its longitudinal axis parallel to the forks and the sickle cutter. The round bale of hay can be cut into half sections and then again into quarter sections. The bale support and cutter may be used for transporting bales with the sickle cutter pressing down against the top of the bale.

11 Claims, 3 Drawing Sheets

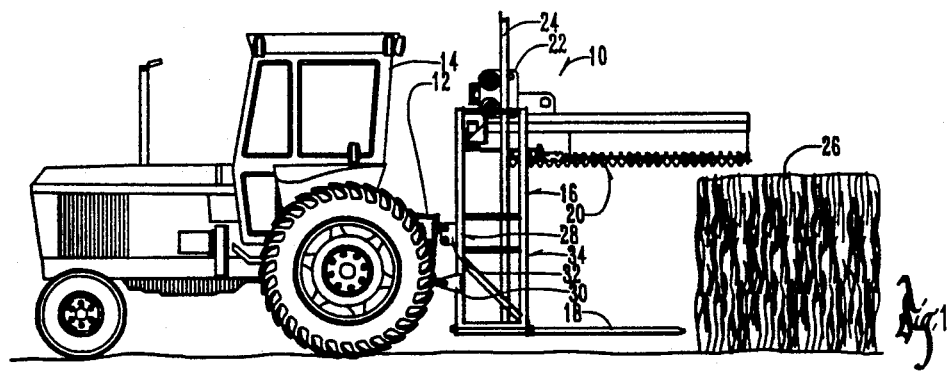
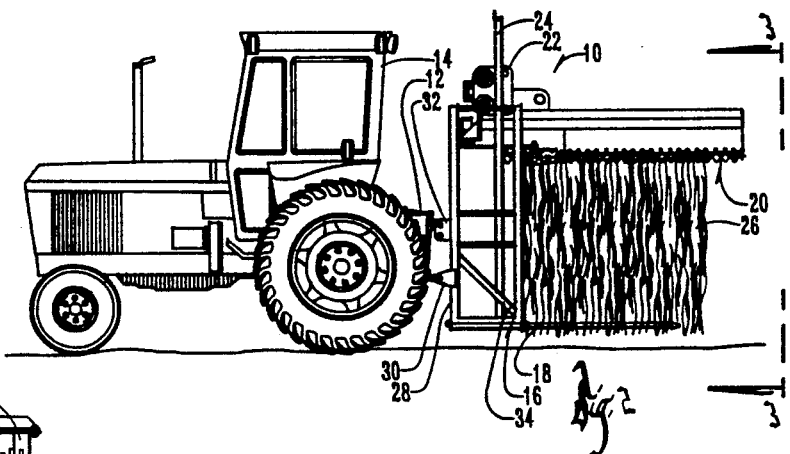
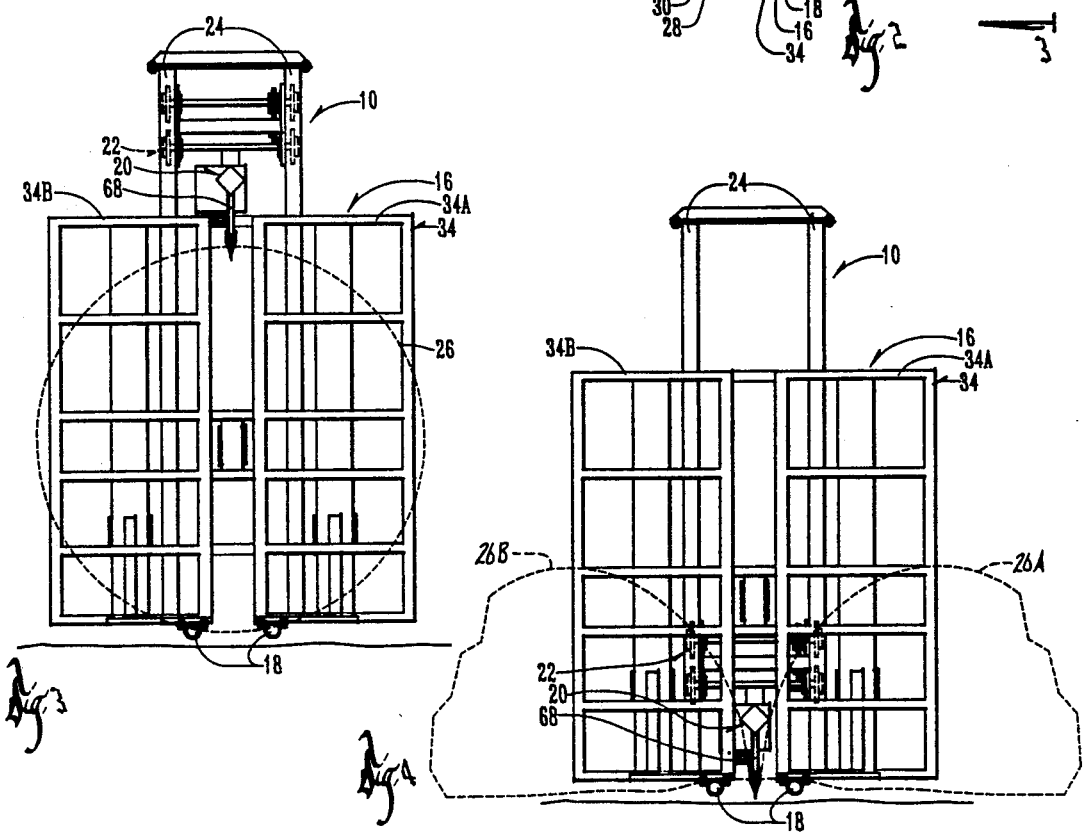

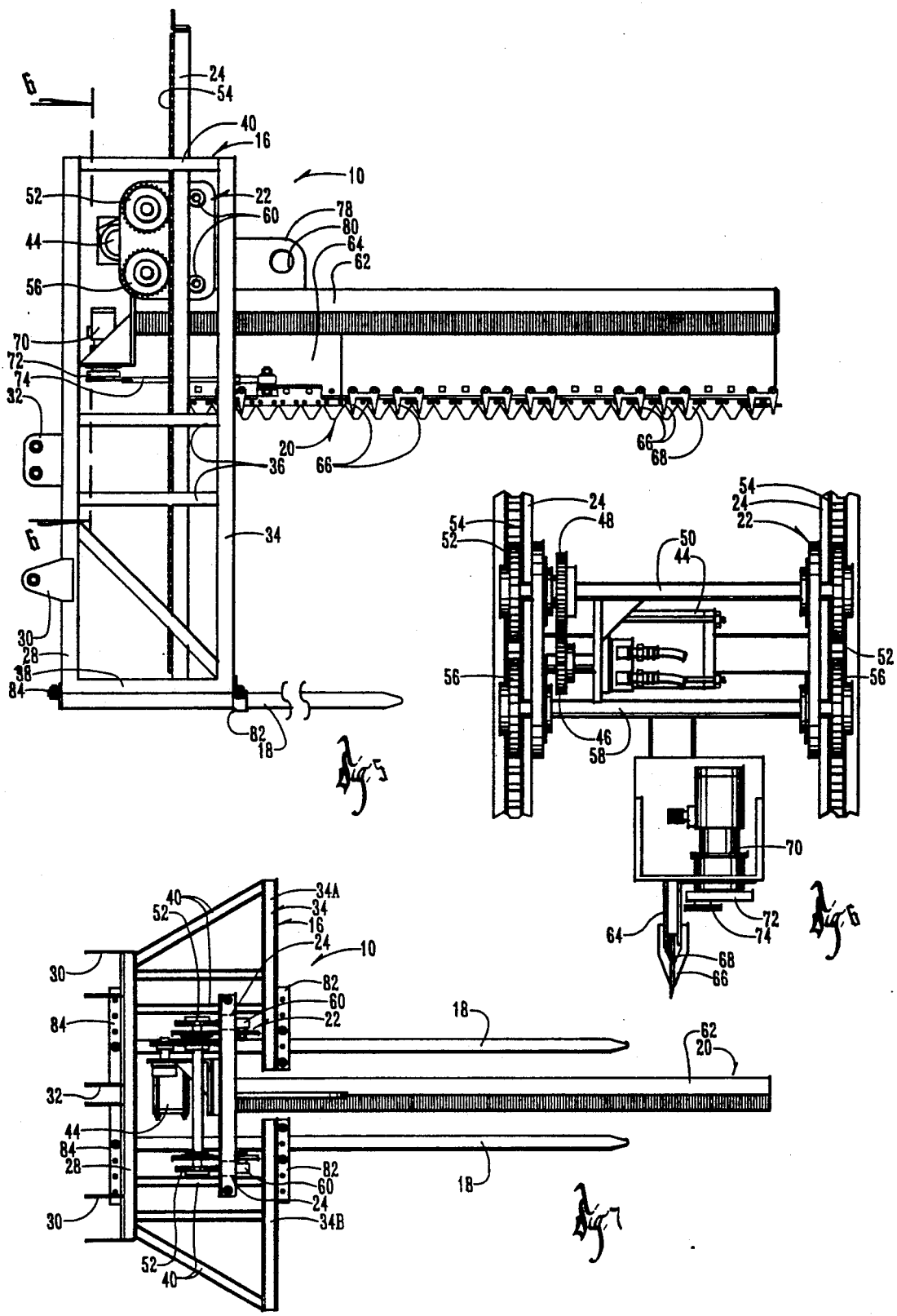

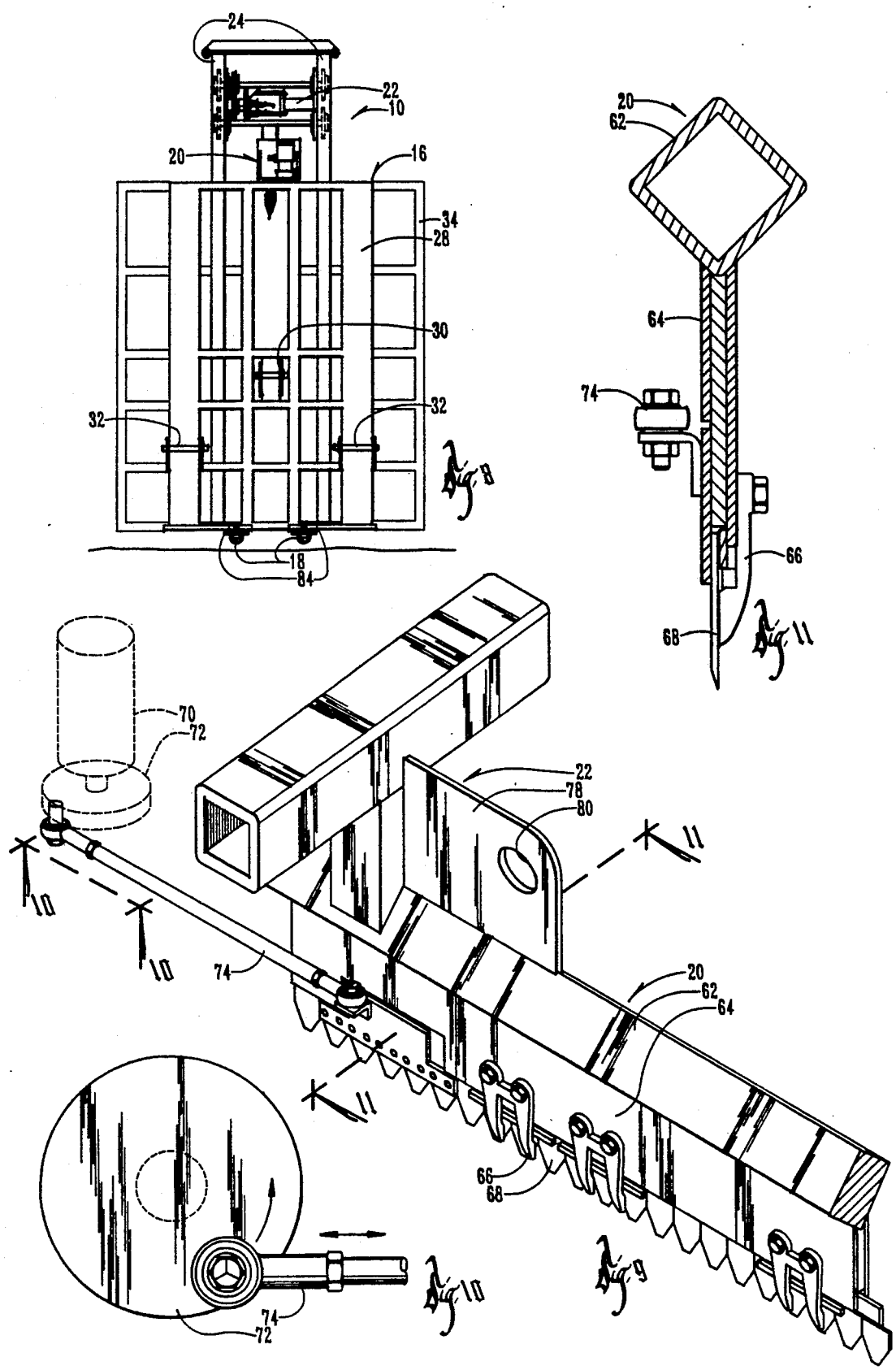

BALE SUPPORT AND CUTTER

BACKGROUND OF THE INVENTION

Cattle feeding operations utilize substantial quantities of hay which are mixed with grain and supplements in mixers. Hay is commonly stored in large, round bales which are too large to be fed into the mixers without being cut up into smaller pieces.

What is needed is a single piece of equipment that can be quickly mounted on a tractor for hauling a round bale from a bale storage stack to the feed mixing and feeding site where the bale can be cut into smaller sections by the same piece of equipment that is used to move it.

SUMMARY OF THE INVENTION

The bale support and cutter of this invention involves a frame mountable by a 3 point hitch on a tractor. The frame has a pair of forks extending rearwardly at the bottom end and a sickle cutter is movable vertically above the forks and is adapted to pass between the forks as it cuts through the bale of hay.

The tractor is backed into a round bale of hay with the forks being positioned under the bale parallel to the bale's longitudinal axis. The sickle cutter is lowered onto the top of the bale to hold it tight against the forks and prevent it from rolling to one side or the other. The 3 point hitch is then used to raise the unit off the ground for moving the bale to the mixing and feeding site. The bale is held above the ground and after the twine is removed the sickle cutter is operated cutting down through the hay whereupon the two bale half sections will fall off the forks on opposite sides onto the ground. The forks are positioned sufficiently close together that the bale half sections will fall away when the sickle cutter has passed completely through the bale. The bale half sections can then be loaded onto the forks in a similar fashion and cut thereby providing quarter hay sections from the original round bale. These sections of hay can then be piled up and loaded with a front end loader into the feed mixer.

DESCRIPTION OF THE DRAWINGS

FIG. 1 is a side elevational view of the bale support and cutter ready to load a bale.

FIG. 2 is a side elevational view similar to FIG. 1 but showing the bale loaded on the support forks and held by the cutter for transport or cutting purposes.

FIG. 3 is a cross sectional view taken along line 3—3 in FIG. 2 thereof showing the sickle cutter in a raised position prior to the beginning of the cutting operation.

FIG. 4 is a view similar to FIG. 3 but showing the sickle cutter in its lowered position having cut through the bale.

FIG. 5 is a side elevational view thereof.

FIG. 6 is a cross sectional view taken along lines 6—6 in FIG. 5.

FIG. 7 is a top plan view thereof.

FIG. 8 is a rear elevational view thereof.

FIG. 9 is a fragmentary perspective view of the cutter sickle.

FIG. 10 is a cross sectional view taken along line 10—10 in FIG. 9.

FIG. 11 is a cross sectional view taken along line 11—11 in FIG. 10.

DESCRIPTION OF THE PREFERRED EMBODIMENT

The bale support and cutter of this invention is referred to generally in FIG. 1 by the reference numeral 10 and is shown mounted on the 3 point hitch 12 of a tractor 14.

The bale support and cutter 10 include a frame 16 to which a pair of bale support forks 18 extend rearwardly from the lower end. A sickle cutter 20 includes a cutter head 22 movable up and down along a pair of rails 24 for cutting a bale 26 into half sections 26A and 26B as seen in FIG. 4.

The frame 16 includes an inner frame section 28 connected to the tractor through the 3 point hitch brackets 30 and 32 as seen in FIG. 5. The inner frame section 28 is connected to an outer frame section 34. The rails 24 are positioned between the inner and outer frame sections 28 and 34 and are connected to frame members 36, 38 and 40 as seen in FIG. 5 which also interconnect the inner frame 28 to the outer frame 34. It is seen in FIG. 7 that the inner frame 28 is narrower than the outer frame 34 which engages the bale end as seen in FIG. 3. The outer frame 34 is split into two sections 34A and 34B as seen in FIG. 7 which are spaced apart to allow the sickle cutter 20 to move therebetween.

The sickle cutter 20 including the cutter head 22 is powered by a lift hydraulic motor 44 which is connected to a sprocket 46 which in turn drives a sprocket 48 on a shaft 50 which carries a sprocket 52 which engages a sprocket chain 54 extending length of the rail 24 as seen in FIG. 6. The shaft 50 also drives a second sprocket 52 engaging the sprocket chain 54 on the other rail 24. For stabilization of the cutter head 20 on the rails 24, a second pair of sprockets 56 are carried on a shaft 58 below the sprockets 52 and engage the sprocket chain 54. Four rollers 60 engage the rails 24 on the opposite sides from the sprockets 52 and 56 as seen in FIG. 5 and thereby totally stabilizing the sickle cutter 20 and cutter head 22.

The sickle cutter 20 includes a support tube 62 diagonally mounted on the cutter head 22 and includes a plate 64 extending downwardly therefrom as seen in FIG. 5 with sickle guards 66 mounted therealong on opposite sides. A sickle 68 moves through the guards 66 in response to a hydraulic motor 70 connected to an eccentric plate 72 to which a connecting arm 74 extends to the sickle 68.

A gusset and support plate 78 extends between the support tube 62 and the cutter head 22 and includes an opening 80 to which a chain may be connected for connecting to the frame 16 to support the sickle cutter 20 when it is not being used such as during transport without a bale being carried.

The bale support forks 18 are adjustably spaced apart as seen in FIG. 7 by being connected to bracket 82 on the outer frame 34 and bracket 84 on the inner frame 28. The spacing between these forks should be such that the bale half sections 26A and 26B will fall to the side when the bale 26 is cut as seen in FIG. 4.

Thus is seen in operation that the 3 point hitch 12 of the tractor 14 is connected to the 3 point hitch brackets 30 and 32 on the bale support and cutter 10 and appropriate hydraulic hoses for the lift motor 44 and sickle motor 70 are connected to the pump system of the tractor. The bale support and cutter 10 are backed under a bale 26 as seen in FIG. 1 and the sickle cutter 20 is lowered against the top of the bale with it raised off the ground by the bale support forks 18. The bale 26 may be moved to any desired location, such as to the mixing and cattle feeding site. Operation of the sickle 68 and lowering of the sickle cutter 20 onto the bale half sections 26A and 26B which will fall to opposite sides onto the ground. It is seen that the sickle 68 will pass below the horizontal plane of the bale support forks 18 to assure complete cutting of the bale into half sections. The forks can then be repositioned under the half bale sections and the cutting operation is repeated to produce quarter sections not shown. The hay is then piled and hauled with a front end loader to the feed mixer which can now handle the reduced in size bale sections.

I claim:

1. The method of cutting a round bale into half sections comprising the steps of,
   providing a pair of spaced apart parallel horizontally extending bale support members on a prime mover with an elongated horizontally extending cutter vertically movably centered above and parallel to the support members,
   loading a round bale onto the pair of support members with the longitudinal axis of the bale being parallel to the support members,
   positioning the bale above the ground,
   lowering the cutter onto the bale, and
   operating the cutter and moving it through the bale and between the support members to a position below the plane of the support members for the cut bale half sections to fall away from the support members when the cutter has passed completely through the bale.

2. A hay bale support and cutter comprising;
   a vertically disposed frame adapted to be raiseable and lowerable by a prime mover lifting means;
   a pair of spaced apart parallel horizontally extending bale support members connected to said frame and being in a horizontal plane;
   an elongated horizontally extending cutter vertically movably connected to said frame and centered above and between and parallel to said support members;
   power means connected to said cutter adapted for moving said cutter downwardly into and through a bale of hay on said support members, and said cutter being horizontally positioned throughout said cutters vertical movement, and
   said support members being free of any obstructions therebetween that would interfere with said cutter moving into the plane of said support members.

3. A hay bale support and cutter comprising;
   a vertically disposed frame raised and lowered by a prime mover lifting means;
   a pair of spaced apart parallel horizontally extending bale support members connected to said frame and being in a horizontal plane;
   an elongated horizontally extending cutter vertically movably connected to said frame and centered above and between and parallel to said support members;
   power means connected to said cutter adapted for moving said cutter downwardly into and through a bale of hay on said support members, and said cutter being horizontally positioned throughout said cutter vertical movement,
   said support members being free of any obstructions therebetween that would interfere with said cutter moving into the plane of said support members,
   said frame including at least one vertically disposed rail to which said cutter is moveably connected, and
   a sprocket chain extending the substantial length of said rail and said power means for moving said cutter including a powered sprocket gear in engagement with said sprocket chain for walking said cutter up and down said rail.

4. The structure of claim 3 wherein said cutter is moveable from above said support members to below a horizontal plane through said support members.

5. The structure of claim 4 wherein said support members are spaced apart sufficiently to support a bale but are close enough together for said bale to split in half and fall to opposite sides of said support members upon said cutter cutting through said bale.

6. The structure of claim 3 wherein said frame is carried by a prime mover and vertically positioned with said support members positioned above the ground and said cutter adapted to be moved downwardly into engagement with the top side of a bale to stabilize the bale against said support members for being transported by said prime mover.

7. The structure of claim 3 wherein said frame includes 3 point hitch means for connecting it to a prime mover.

8. The structure of claim 3 wherein said frame includes a second vertically disposed rail spaced from said first rail and moveably supporting said cutter.

9. The structure of claim 8 wherein sprocket chains extend the substantial length of said first and second rails and said power means for moving said cutter includes powered first and second sprockets in engagement with said sprocket chains for walking said cutter up and down said rails.

10. The structure of claim 9 wherein said cutter includes a pair of sprockets below said first and second sprockets and in engagement with the adjacent chain for stabilizing said cutter on said pair of rails.

11. The structure of claim 10 wherein opposing rollers are carried on said cutter on the opposite side of said rails from said sprockets and in engagement with said rails to further stabilize said cutter on said rails.

* * * * *